3,332,926
THERMAL DEGRADATION OF POLYOLEFINS IN THE PRESENCE OF A METAL SALT CARBOXYLIC ACID CATALYST
Joseph J. Baron, Jr., Morris Plains, and Julius P. Rakus, Bernards Township, Somerset County, N.J., assignors to Allied Chemical Corporation, New York, N.Y., a corporation of New York
No Drawing. Filed Feb. 21, 1964, Ser. No. 346,419
12 Claims. (Cl. 260—93.7)

This invention relates to the thermal degradation of polyolefins to produce relatively low molecular weight hydrocarbon polymers, useful, for example, as wax substitutes and blending agents, coating compositions and, in general, in fields where hydrocarbon resins and waxes find utility. This invention relates more particularly to processes for the thermal degradation of highly crystalline homopolymers or copolymers of ethylene, propylene, butene-1 and other olefins, particularly olefins having up to 6 carbon atoms.

The thermal degradation or depolymerization of relatively high molecular weight polyolefins in the absence of oxygen to obtain lower molecular weight polymers has been investigated by a number of researchers. When polyolefins are subjected to high-temperature degradation, for example at temperatures above about 250° C., several competing reactions take place such as depropagation reactions involving polymer fragmentation, intermolecular transfer and decomposition reactions, etc. When depropagation reactions, also termed "unzipping" of the chain radical, take place more rapidly than the other reactions, monomer formation results without the desired decrease in average weight of the residual polymers. This, of course, is objectionable when polyolefins are subjected to thermal degradation to obtain lower molecular weight polymers because it results in poor yields of the desired polymers and frequently interferes with the obtainment of polymers having the desired molecular weight range.

It is a principal object of the present invention to improve polyolefin thermal degradation procedures to make such procedures more economical to carry out, for example by providing procedures which result in the desired lower molecular weight polymers at lower temperatures or in markedly shorter time periods at a given temperature, or both, resulting in a savings in the heat requirements of the processes.

Another object of this invention is to provide a process of thermally degradating crystalline high molecular weight polyolefins to provide highly crystalline polyolefins of desired lower average molecular weight having an appreciably narrower range of molecular weight molecules forming the polymer than in the starting higher molecular weight polyolefins subjected to thermal degradation.

Another object of this invention is to provide a catalytic process for effecting the thermal degradation of crystalline polyolefins to produce lower molecular weight polymers with minimum formation of monomer.

Still another object of this invention is to provide such catalytic process employing catalysts which do not require special handling precautions to retain their catalytic activity, which are soluble in the desired lower molecular weight polymers, are colorless, inexpensive and non-toxic, an hence particularly useful in producing wax-like low molecular weight polymers for use in coating compositions including petroleum wax coating compositions.

Other objects and advantages of the present invention will be apparent from the following detailed description thereof.

Among the highly crystalline polyolefins are linear polyethylenes and stereoregular polymers of olefins, including alpha-olefins having 3 or more carbon atoms. The stereoregular polymers are those in which the alkyl groups pendent to the main hydrocarbon polymer chain exhibit a regular steric order in relation to each other. The proportion of stereoregular polymers in a polyolefin is frequently referred to as the isotactic content of the polyolefin. This isotactic content is commonly determined by ascertaining the proportion of the polyolefin left after extraction with diethyl ether; the portion of the polyolefin which dissolves in the diethyl ether is the amorphous or atactic fraction.

Polymerization of olefins in the presence of Ziegler type and other catalysts gives mixtures comprising a crystalline polyolefin fraction, an amorphous fraction and a partially crystalline fraction. By extracting such mixtures with diethyl ether, acetone or heptane, and thus effecting the removal of atactic material, polyolefins can be produced having various degrees of crystallinity.

The processability of polyolefins, for example their formation into useful products by extrusion, blow molding, calendering, injection molding, blending with other resins or waxes, is dependent among other properties, on the softening point of the polyolefin, and melt viscosity. The viscosity of a molten polyolefin in general is proportional to its molecular weight. For many uses it is important that the molecular weight be much lower than that of the highly crystalline polyolefin produced by the polymerization process. Certain olefins such as propylene and butene polymerize directly only to high molecular weight, highly crystalline polymers. Controlled polymerization thereof to obtain low molecular weight polymers results in non-crystalline oils and greases which cannot be used in certain fields, as, for example, in the coating field where high crystallinity is a required property.

In accordance with this invention, crystalline polyolefins having an isotactic content of at least 60% and preferably having a molecular weight above 250,000 are heated in the presence of from 0.075% to 10% metal salt of a carboxylic acid catalyst in the absence of oxygen to a temperature of from 275° C. to 450° C. or higher, particularly when using superatmospheric pressure conditions, preferably to a temperature of from 300° C. to 400° C., for a period which will vary depending upon the temperature, catalyst and the amount of catalyst used, which time period is adequate to produce the desired reduction in molecular weight. Employing the preferred catalysts hereinafter disclosed in amounts and at temperatures within the upper portion of the above mentioned respective ranges, the time of heating can be as little as five minutes; using an amount of catalyst in the lower portion at the lower temperatures, within the aforesaid range of 0.075% to 10%, the time of heating can be from 4 to 5 hours.

In this specification, all percentages are given on a weight basis.

Employing the catalyst thermal degradation process of the present invention, desired lower molecular weight polyolefins can be obtained either at appreciably lower temperatures or by heating for markedly shorter periods of time as compared with thermal degradation procedures in the absence of the catalysts and this with minimization of monomer formation.

The heating of the polymer, catalyst mixture can be carried out in any suitable closed equipment such as a batch reactor or continuous reactor through which the mixture of polymer and catalyst is passed continuously for the necessary residence time to produce at the temperature of operation the desired lower molecular weight polyolefin. The heating can be carried out under vacuum, at ambient pressures or under superatmospheric pressure conditions. In the case of batch operations at ambient or superatmospheric pressure conditions the heating can be carried out under a blanket of nitrogen or other oxygen-free atmosphere. Heating under vacuum and removing the air present in the reactor before commencing the heating results in the desired oxygen-free atmosphere.

If desired the mixture of catalyst and polymer can be stirred or agitated during the heating; stirring the mixture during the heating aids in heat transfer and contact between catalyst and polymer.

The catalyst used is a metal salt of a monocarboxylic, dicarboxylic or tricarboxylic aliphatic, phenyl or naphthyl carboxylic acid, including the hydroxy substituted carboxylic acids, or a mixture of such metal salts. Preferred are the metal salts of aliphatic monocarboxylic acids containing from 2 to 18 carbon atoms, particularly the soaps such as the alkali metal or alkaline earth metal stearates, oleates, myristates, palmitates, or mixtures thereof which are soluble in the relatively low molecular weight polymers, are colorless, inexpensive and non-toxic, resulting in the production of wax-like low molecular weight polymers having the catalyst dissolved therein useful as coating compositions, including use as blending agents for petroleum wax coating compositions. Employing these soap type catalysts for the production of lower molecular weight polymers for blending with petroleum wax for use as coatings, removal of the catalyst from the polymer is not necessary. Polymers containing these catalysts can be blended with petroleum wax without causing discoloration of the blend.

Examples of catalysts which can be used are the alkali metal and alkaline earth metal, particularly the sodium, potassium, calcium or magnesium, and the heavy metal such as antimony, bismuth, cadmium, chromium, copper, iron, lead, mercury, tantalum, titanium, thallium, vanadium and zinc stearates, oleates, palmitates, myristates, citrates, tartrates, benzoates, succinates, salicylates, naphthoates, hydroxy naphthoates and phthalates. Examples of these and other catalysts are given in the tables which follow.

The following examples are given to exemplify the invention without however limiting this invention to these illustrative examples.

Molecular weights were determined by solution viscosity measurements (see R. Chiang, Journal Polymer Science, 28, 235 (1958)).

In Table I below is given the data on a series of four examples involving the degradation of polybutene-1 having a molecular weight of 660,000 employing sodium stearate as the catalyst in the amount indicated in the table. The mixture of catalyst and polybutene-1 was heated to 375° C. under 2 mm. of mercury pressure for the time periods indicated in the table.

TABLE I

| Ex. No. | Sodium Stearate Catalyst, Percent | Time, Min. | Yield Percent | Molecular Weight |
|---|---|---|---|---|
|  | No catalyst | 30 |  | 200,000 |
| 1 | 1.0 | 30 | 97 | 24,000 |
| 2 | 0.5 | 30 | 97 | 45,000 |
|  | No catalyst | 60 |  | 150,000 |
| 3 | 1.0 | 60 | 95 | 10,000 |
| 4 | 0.5 | 60 | 96 | 13,000 |

In Table II data is given on a series of examples involving the heating of polybutene-1 having a molecular weight of 450,000 admixed with 0.2% of the indicated catalyst under atmospheric pressure conditions for 30 minutes at a temperature of 375° C.

TABLE II

| Ex. No. | Catalyst | Molecular Weight of Product |
|---|---|---|
|  | No catalyst | 59,000 |
| 5 | Sodium Stearate | 20,600 |
| 6 | Commercial Soap | 34,000 |
| 7 | Sodium Stearate | 21,000 |
| 8 | Calcium Stearate | 21,000 |
| 9 | Magnesium Stearate | 21,000 |
| 10 | Zinc Stearate | 47,000 |
| 11 | Sodium Oxalate | 22,000 |
| 12 | Potassium Acid Phthalate | 17,500 |
| 13 | Sodium Citrate | 41,000 |
| 14 | Sodium Acetate | 21,500 |
| 15 | Sodium Tartrate | 22,500 |

Example 16 was carried out under a blanket of nitrogen at atmospheric pressure. 798 grams of polybutene-1 having a molecular weight of 400,000 and an isotactic content of 91.2% was mixed with about 2 grams of sodium stearate. The mixture was heated for 1¾ hours at a temperature of 320° C. 93% of polybutene-1 having a molecular weight of 5500 was thus obtained.

The substitution of polyethylene or polypropylene for the polybutene in the above examples gives lower molecular weight polyethylene and polypropylene polymers, respectively, in substantially the same manner. Thus linear polyethylene having a molecular weight of about 1,750,000 when heated in the presence of from about 1% to 5% of a catalyst as herein disclosed at about 350° C. for two hours gives a polyethylene having a molecular weight below 100,000. A highly crystalline polypropylene having a molecular weight of 330,000 heated for about two hours in the presence of from 1% to 5% catalyst in an inert atmosphere gives a polypropylene having a molecular weight of from 10,000 to 75,000.

In the above examples the substitution of other catalysts such as the alkali metal, alkaline earth metal and heavy metal (hereinabove disclosed) salts of aliphatic fatty acids containing from 2 to 18 carbon atoms or such salts of citric, tartaric, benzoic, succinic, salicylic, naphthoic, hydroxy naphthoic or phthalic acids give comparably lower molecular weight polyolefin resins.

It will be noted that the present invention provides catalytic processes for effecting the thermal degradation of polyolefins to produce desired lower molecular weight polymers at lower temperatures with shorter heating periods at a given temperature or even at lower temperatures, thus resulting in a saving in the heat requirements of the processes. The polymers produced uniformly and invariably have an appreciably narrower range of molecular weight molecules than in the starting higher molecular weight polyolefins subjected to thermal degradation. Hence the polymer products have better processability; because of the narrow molecular weight distribution of the molecules in the polymer product produced by the processes of this invention the polymers have lower melt viscosities which is highly desirable, e.g., in the production of coating compositions employed in waterproofing paper or paperboard such as used in the manufacture of cartons and wrappers where the coating compositions must be applied at temperatures which will not deleteriously affect the fiber substrate.

The thermal degregation of polyolefins employing alkali metal or alkaline earth metal fatty acid salts has the additional advantage that these catalysts are colorless, inexpensive, non-toxic, readily available, and require no special precautions for retention of their catalyst activity. The use of such catalysts is particularly advantageous in the production of polymers having a relatively narrow range of molecular weights and viscosity characteristics rendering them useful as coating compositions or as blending agents for petroleum waxes.

Since certain changes in carrying out the thermal degradation process of this invention can be made without departing from its scope, it is intended that all matter contained in the above description, including the examples, shall be interpreted as illustrative and not in a limiting sense.

What is claimed is:

1. The polyolefin degradation process which comprises mixing with a crystalline polyolefin from 0.075% to 10% by weight of a metal salt of a carboxylic acid and heating the resultant mixture in an atmosphere substantially free of oxygen to a temperature within the range of from 275° C. to 450° C. to produce a polymer having an appreciably lower molecular weight than the starting polyolefin.

2. The process of thermal degradation of a polyolefin from the group consisting of polypropylene and polybutene having an isotactic content of at least 60% by weight and having a molecular weight in excess of 250,000, which process comprises mixing the polyolefin with 0.075% to 10% by weight of a catalyst from the group consisting of an alkali metal, alkaline earth metal, antimony, bismuth, cadmium, chromium, copper, iron, lead, mercury, tantalum, titanium, thallium, vanadium and zinc salt of a mono-, di- and tri-aliphatic, phenyl and naphthyl carboxylic and hydroxy substituted carboxylic acid, and heating the resultant mixture in an atmosphere substantially free of oxygen to a temperature of from 300° C. to 400° C. for a period of time sufficient to produce a polyolefin polymer having a molecular weight appreciably below the molecular weight of the starting polyolefin.

3. The process as defined in claim 2, in which the catalyst is sodium stearate.

4. The process as defined in claim 2, in which the catalyst is soap.

5. The process as defined in claim 2, in which the catalyst is calcium stearate.

6. The process as defined in claim 2, in which the catalyst is magnesium stearate.

7. The process as defined in claim 2, in which the catalyst is zinc stearate.

8. The process as defined in claim 2, in which the catalyst is sodium oxalate.

9. The process as defined in claim 2, in which the catalyst is sodium citrate.

10. The process as defined in claim 2, in which the catalyst is sodium acetate.

11. The process as defined in claim 2, in which the catalyst is sodium tartrate.

12. The process as defined in claim 2, in which the catalyst is potassium acid phthalate.

References Cited

UNITED STATES PATENTS 3,207,739   9/1965   Wales _____ 260—94.9

JOSEPH L. SCHOFER, *Primary Examiner.*

L. EDELMAN, *Assistant Examiner.*